Figure 1:
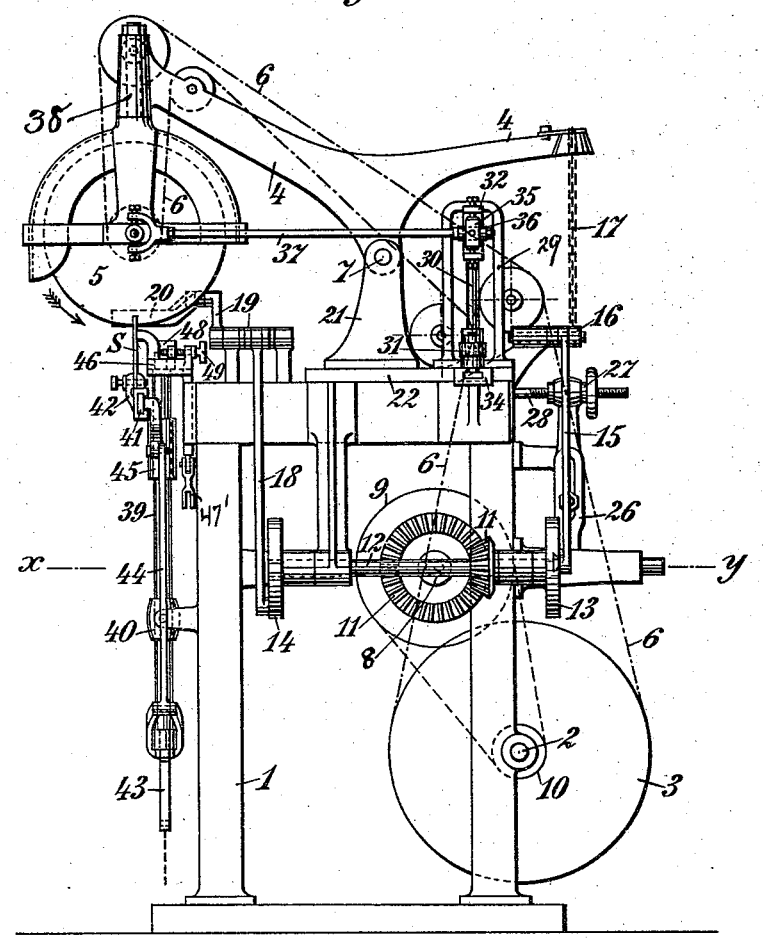

(No Model.) 3 Sheets—Sheet 1.

F. SCHMALTZ.
MACHINE FOR SHARPENING SAWS.

No. 490,927. Patented Jan. 31, 1893.

Witnesses
O. E. Duffy
H. E. Peck.

Inventor
Friedrich Schmaltz
Per
O. E. Duffy
Attorney (No Model.) 3 Sheets—Sheet 2.
F. SCHMALTZ.
MACHINE FOR SHARPENING SAWS.
No. 490,927. Patented Jan. 31, 1893.
Fig. 3.
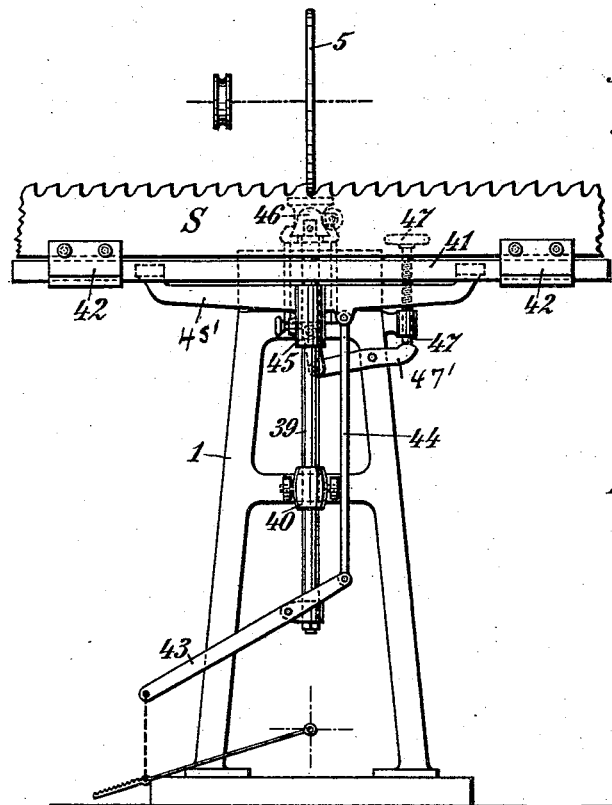
Fig. 4.
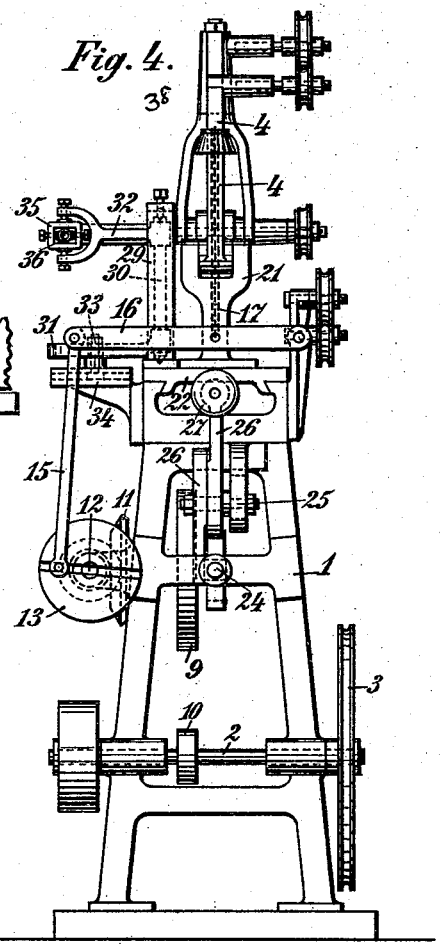
Fig. 7.
Fig. 8.
Fig. 9.
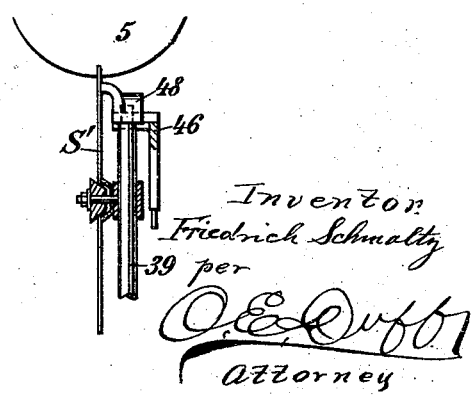
Witnesses
E C Duffy
Chas M Werle
Inventor
Friedrich Schmaltz
per
O E Duffy
Attorney
THE NORRIS PETERS CO., PHOTO-LITHO., WASHINGTON, D. C.

(No Model.) 3 Sheets—Sheet 3.

F. SCHMALTZ.
MACHINE FOR SHARPENING SAWS.

No. 490,927. Patented Jan. 31, 1893.

Fig. 5.ª

Fig. 6.ª  Fig. 6.ᵇ

Inventor
Friederich Schmaltz
per
O. E. Duffy
Attorney

Witnesses
E. C. Duffy
H. E. Beck

United States Patent Office.

FRIEDRICH SCHMALTZ, OF OFFENBACH-ON-THE-MAIN, GERMANY.

MACHINE FOR SHARPENING SAWS.

SPECIFICATION forming part of Letters Patent No. 490,927, dated January 31, 1893.

Application filed November 9, 1891. Serial No. 411,410. (No model.) Patented in Austria-Hungary March 30, 1889, No. 50,047, August 16, 1889, No. 15,799, and April 2, 1890, No. 51,993; in Belgium April 4, 1889, No. 85,749, and December 31, 1889, No. 89,032; in England April 13, 1889, No. 6,373; in France April 16, 1889, No. 197,526; in Germany November 24, 1889, No. 52,281; in Norway May 9, 1890, No. 1,650, and in Sweden October 23, 1890, No. 2,621.

*To all whom it may concern:*

Be it known that I, FRIEDRICH SCHMALTZ, of Offenbach-on-the-Main, Grand Duchy of Hesse, German Empire, have invented certain new and useful Improvements in Self-Acting Saw-Sharpeners, (patented in the following countries, viz: Germany, No. 52,281, dated November 24, 1889; Austria-Hungary, No. 50,047, dated March 30, 1889, No. 15,799, dated August 16, 1889, and No. 51,993, dated April 2, 1890; England, No. 6,373, dated April 13, 1889; Sweden, No. 2,621, dated October 23, 1890; Norway, No. 1,650, dated May 9, 1890; Belgium, No. 85,749, dated April 4, 1889, and No. 89,032, dated December 31, 1889, and France, No. 197,526, dated April 16, 1889;) and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

The object of the present invention is a self-acting sharpening machine for band-saw-blades, circular and other saws, which will not grind the faces of the teeth parallel to each other and under a right angle to the surface of the saw blade, but which by means of a revolving emery-disk gives to the cutting faces and to the backs of the teeth an alternately slanting shape, so that each tooth is worked into a point with an edge in form of a knife and that the cutting ability of the saw is greatly increased. The alternate oblique grinding of the front and back faces of the teeth is effected by three different motions of the emery-wheel and of the saw being under operation. These motions are first, the rise and fall of the revolving emery-wheel; second, the feed motion of the saw, from which two motions depends the outline form of the teeth, and third, the forward and rearward motion of the emery-wheel which oscillates simultaneously around its vertical shaft. The different parts of the machine, producing the aforesaid motions, are so arranged, that every one of the same can be adjusted in position with relation to the others, so that any desired size of the teeth and any desired slant of their faces may be obtained.

Figure 2:
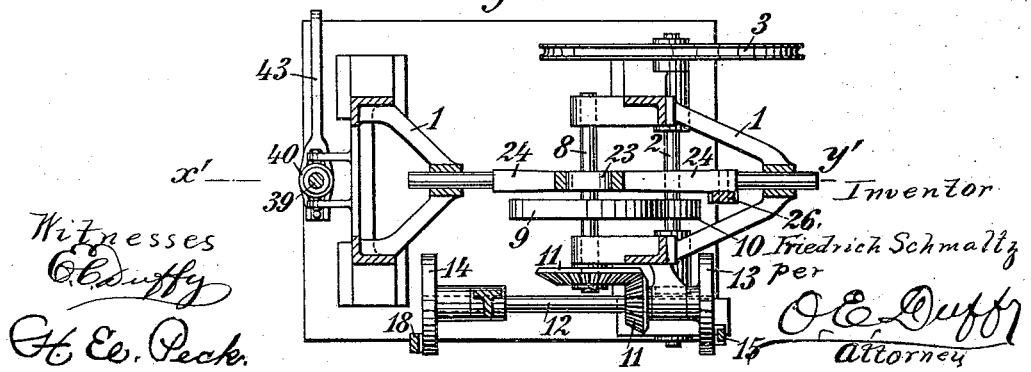
Figure 5:
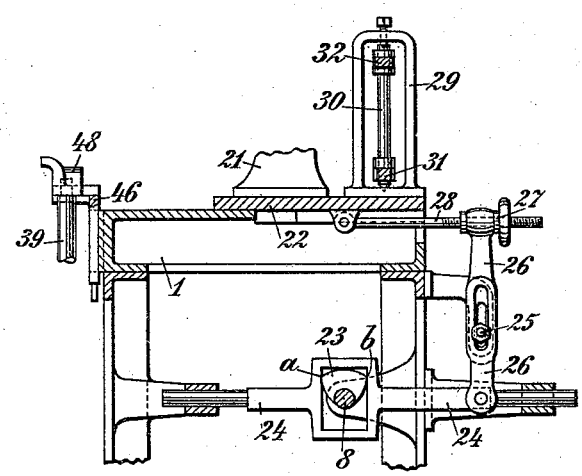
Figure 6:
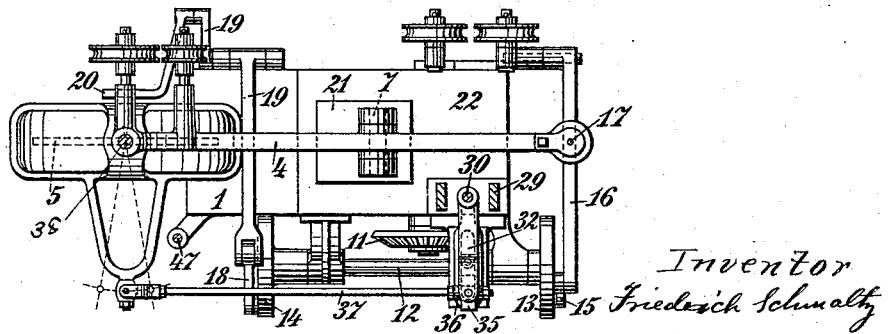
Figure 6:
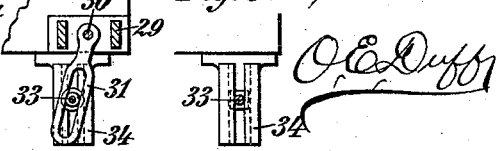

The machine is represented in the accompanying three sheets of drawings, in which Figure 1 is a side elevation of the same, Fig. 2 is a horizontal section on line $x$—$y$ Fig. 1, Fig. 3 is a partial front elevation, Fig. 4 is a rear elevation and Fig. 5 is a vertical section on line $x'$—$y'$ Fig. 2. Fig. 6 is a plan view. Fig. 7 represents a part of the sharpened saw-blade. Fig. 8 is a detail of the machine for sharpening circular saws and Fig. 9 is a detail of a modification. Fig. $5^a$ is a detail view showing a guide or support. Fig. $6^a$ is a detail view showing one of the levers that operate the lateral motion of the emery wheel, and Fig. $6^b$ is a detail view showing a support attached to the frame of the machine.

The frame of the machine is designated in the drawings by the numeral 1.

2 is the driving shaft, carrying the driving pulley 3 which imparts motion by means of a cord 6 to the emery-wheel 5, acting upon the surfaces of the teeth of the saw. The said emery-wheel is hung in an oscillating arm 4 having its fulcrum 7 on the post 21 from the frame of the machine. A shaft 8, turning in bearings arranged inside of the frame, receives motion from the driving shaft 2 by means of a belt and pulleys 9 and 10; this shaft 8 transfers motion by means of bevel gears 11 to a shaft 12 arranged on one side of the frame. Two crank wheels 13 and 14 are fastened upon the ends of said shaft.

The crank wheel 13 is connected to a lever 16 (Figs. 1 and 4) by means of a rod 15; the oscillations of said lever 16 make the arm 4 swing around its fulcrum so that the emery-wheel receives an upward and downward motion, the lever 16 being connected to the arm 4 by a chain 17, the downward motion being effected by the weight of the emery-wheel. The crank pin in the disk 13 can be displaced in a groove so that the stroke of the emery-wheel can be increased or diminished as desired. The crank wheel 14 acts by its crank-pin and by a rod 18 substantially in the same way upon the elbow lever 19 which by its ratchet-link engages into the notches of the saw-blade, thus producing the feed of the saw, which remains stationary during a half revolution of the disk 14, when the ratchet 20 slides freely over the back of a tooth and then falling into a notch pushes the saw forward during the other half revolution. The crank pin of this disk can also be displaced in a slot, so that the stroke of the ratchet may be adjusted to any distance of the teeth. Moreover the disk 14 is so attached upon the shaft 12, that it may be turned with relation to disk 13, thereby means are secured to effect the rising of the emery-wheel sooner or later with reference to the feed of the saw. It is obvious that by these arrangements any desired tooth form may be produced. The oblique position of the emery-wheel to the saw, necessary for the alternate slants of the cutting and back faces of the teeth is here effected by the forward and backward motion of the emery-wheel which at the same time turns on its vertical shaft, while the saw remains stationary. To this end the post 21 (Figs. 1, 5 and 6) carrying the arm 4 is arranged upon a slide 22 which receives a jolting reciprocating motion by means of a cam 23 keyed upon the shaft 8 while at the same time the oscillation of the emery-wheel on its vertical shaft is obtained by an appropriate mechanism of levers. The jolting motion of the slide 22 is effected by the cam 23 on the shaft 8 acting upon the rod 24 which can slide to and fro in suitable sockets; the displacement is a sudden one or nearly so, when the corner $a$ of the cam strikes against the frame of the rod 24; when the corner $a$ has reached the middle line of the rod the arch $a$ $b$ is sliding along the frame without giving any motion to the rod, when the corner $a$ is striking against the opposite sides of the frame the rod 24 will be suddenly pushed back. This rod moves a lever 26 swinging on a stud 25 which can be displaced in order to give more or less play to the upper end of the lever 26 which carries a nut 27 screwed upon the rod 28 which is fixed to the slide 22 (Figs. 1 and 5). By turning the nut 27 the throw of the slide can be so adjusted that in its middle position the emery-disk 5 will stand exactly over the saw blade (Fig. 1) and that consequently its forward and backward motion will be of equal extent to both sides of the saw. The circumference of the emery-wheel will thus bring always corresponding parts in contact with the backs of the teeth and therefore the alternate slants of the consecutive teeth will have the same inclination.

In order to give to the emery-wheels the alternative inclined position against the saw so as to form the cutting faces, the following means are provided: A loop 29 (Figs. 1, 4, 5, and 6) fastened upon the slide 22, supports the vertical shaft 30, which is provided with the levers 31 and 32 rigidly attached to the shaft. The lever 31 (Fig. 6ª) is slotted and receives in its slot a pin 33, which can be adjusted in a fork 34 (Fig. 6ᵇ) by means of a set screw, said fork being fastened to the frame. By means of this arrangement the lever 31 is compelled to swing around the said stud 33, while the slide is going backward and forward. At the same time lever 32 will swing, and its throw depends upon the position of the stud 33. The free end of lever 32 is forked and carries between two points a frame 35 in which a sleeve is held, also between two points 36 (Figs. 1 and 4) so that the said sleeve can swing in all directions. A rod 37 (Figs. 1 and 6) is fastened one end to the sleeve 36 and the other end to the frame of the emery-wheel so that the same is alternately swung to the right and to the left around its vertical axle 38 when the slide 22 is jolting backward and forward. The shafts 8 and 12 are arranged in such relation to each other that the shaft 12 makes twice as many revolutions as the shaft 8, i. e. when the slide 22 goes once backward or forward, the emery-wheel 5 makes a full rising and falling motion and at the same time the saw is fed onward for one tooth. The cam 23 is so placed that the jolting motion of the slide and consequently the angular change of position of the emery-wheel commences only, when the emery-wheel just withdraws from the back of a tooth and has finished the same before it comes in contact with the cutting face of the following tooth, when it effects its next descent. The cam 23 may just as well be substituted by an eccentric 50 (Fig. 9). The clamping device for the saw blade to be operated upon is carried by a vertically reciprocating rod 39 (Figs. 1, 2 and 3) arranged in front of the middle of the frame; and slidable in the sleeve 40 hung between two points on the frame 1. The blade-saw S is held by clamps 42 (Fig. 3) sliding on the bar 41; the circular saw S' (Fig. 8) is fastened upon a pin which is made to slide on the rod 39; a beveled ring and nut are used to secure the saw in position. The preliminary placing in position of a saw blade is effected by means of a treadle lever 43 (Fig: 3) having its fulcrum at a point on the rod 39 and having its end by means of rod 44 and frame 45' rigid with the sleeve 45, connected to the sleeve 45 (Figs. 1 and 3) which carries the bar 41. This sleeve 45 which can be fastened on the rod 39 by a set-screw is therefore the support of the clamping device. If a circular saw S' is to be sharpened the sleeve 45 with bar 41 and clamps 42 are taken off and another sleeve is pushed on the rod which is provided with a pin (Fig. 8) upon which the saw is secured in the known manner. Here the preliminary placing is effected in the same way as above described with reference to a blade-saw.

In order to meet with the wearing of the emery-wheel, a small support 46 is provided on the upper end of rod 39 and has a downward extension having its lower end pivoted to a horizontal lever 47' fulcrumed between its ends to the frame. The adjusting screw 47 bears on the outer end of said lever. By adjusting this screw downwardly the rod 39 and saw can be moved upwardly through the medium of lever 47' and support 46.

In order to give a good hold to the saw at the point where the emery-wheel is working and in order to avoid vibrating of the same the support 46 is provided with another smaller support 48 arranged to slide horizontally forward and backward by means of a screw 49 secured to the support 46. The rod 39 can thereby follow the motion, its sleeve 40 being hung up in points.

Having thus described my invention, what I desire to secure by Letters Patent, is:—

1. In a saw sharpening machine, the combination of a main frame, a slide, a vertically rocking frame mounted on the slide, a horizontally turnable frame mounted in one end of the rocking frame and provided with the grinding wheel, means substantially as described to rock said rocking frame, intermediate mechanism substantially as described to reciprocate said slide, intermediate mechanism substantially as described to turn said frame in which the grinding wheel is mounted, and driving mechanism substantially as described.

2. In a saw sharpening machine, the combination of a main frame, a slide, the grinding wheel, the movable frames mounted on the slide and carrying said wheel, means to actuate the grinding wheel, a shaft provided with a cam, a rod reciprocated by said cam, a threaded rod secured to the slide, and a rocking lever having an adjustable fulcrum and at one end secured to the cam operated rod, and at its other end adjustably secured to said threaded rod by a nut as and for the purposes described.

3. In a saw sharpening machine, the combination of a frame, a vertically swinging frame, the grinding wheel carried by said swinging frame, a slide carrying said swinging frame, means substantially as described to reciprocate said slide, and a shaft provided with a crank connected with said swinging frame to rock the same, substantially as described.

4. In a saw sharpening machine, the combination of a main frame, a grinding wheel, a slide, and means to reciprocate the same, a frame mounted thereon, the grinding wheel holder mounted in said frame to turn in a horizontal plane, a vertical shaft on said slide, a slotted lateral arm from said shaft, a stationary pin in the main frame in the slot of said arm, whereby said vertical shaft is rocked as the slide reciprocates, another lateral arm from said shaft and flexible connections therefrom to the grinding wheel holder, substantially as described.

In testimony that I claim the foregoing as my own I affix my signature in the presence of two witnesses.

FRIEDRICH SCHMALTZ.

Witnesses:
   JEAN GRUND,
   ALVESTO S. HOGUE.